United States Patent

Amtsberg et al.

[15] 3,645,341

[45] Feb. 29, 1972

[54] PNEUMATIC NUT-RUNNER HAVING A TORQUE SENSING DEVICE

[72] Inventors: Lester A. Amtsberg, Utica; William K. Wallace, Barneveld, both of N.Y.

[73] Assignee: Chicago Pneumatic Tool Company, New York, N.Y.

[22] Filed: Apr. 13, 1970

[21] Appl. No.: 27,822

Related U.S. Application Data

[62] Division of Ser. No. 788,220, Dec. 3, 1968, Pat. No. 3,538,763.

[52] U.S. Cl. .................................. 173/12, 73/136, 81/52.5
[51] Int. Cl. ........................................................ B25b 23/14
[58] Field of Search .......................... 173/12; 91/59; 73/136; 81/52.4, 52.5

[56] References Cited

UNITED STATES PATENTS 1,985,916   1/1935   Coates et al. ....................... 73/136 X
3,442,177   5/1969   Ulbing et al. ............................. 91/59
3,180,612   4/1965   Spyridakis et al. .................... 173/12 X Primary Examiner—Ernest R. Purser
Attorney—Stephen Rudy

[57] ABSTRACT

A torque sensing device is attached to a bearing mounted housing of a pneumatic nut-running tool. The device utilizes torque reaction transmitted through the tool to the housing to cause actuation of an external push rod to operate a microswitch in a signal circuit when torque of a preset valve has been delivered to the work. As the reactionary torque in the tool is relaxed, the torque sensing device progressively automatically returns to normal condition. The tool is bearing mounted in a supporting block that is fixed to a gang-plate adapted to be held stationary. The gang-plate is adapted to carry a plurality of such tools, the torque sensing device of each of which is associated with a separate microswitch in a common signal circuit.

4 Claims, 5 Drawing Figures

PATENTED FEB 29 1972
3,645,341
FIG.1 FIG.3
FIG.2
FIG.4
FIG.5
INVENTORS
LESTER A. AMTSBERG
WILLIAM K. WALLACE
BY
Stephen J. Rudy
ATTORNEY
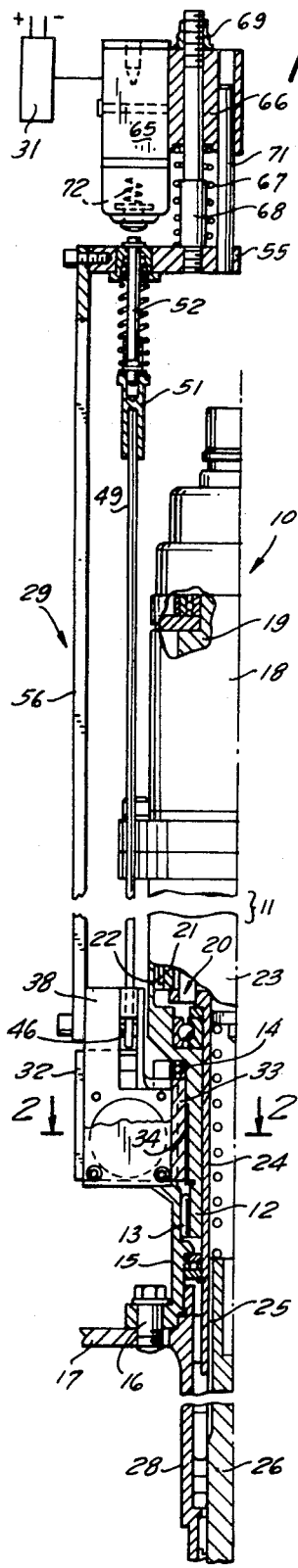
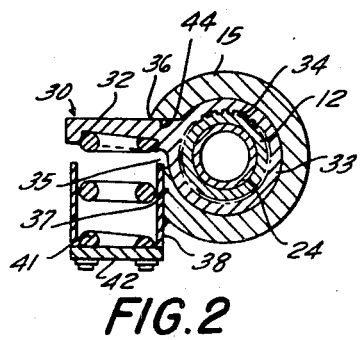
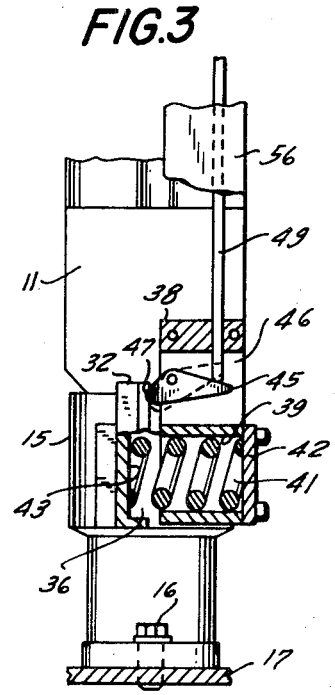
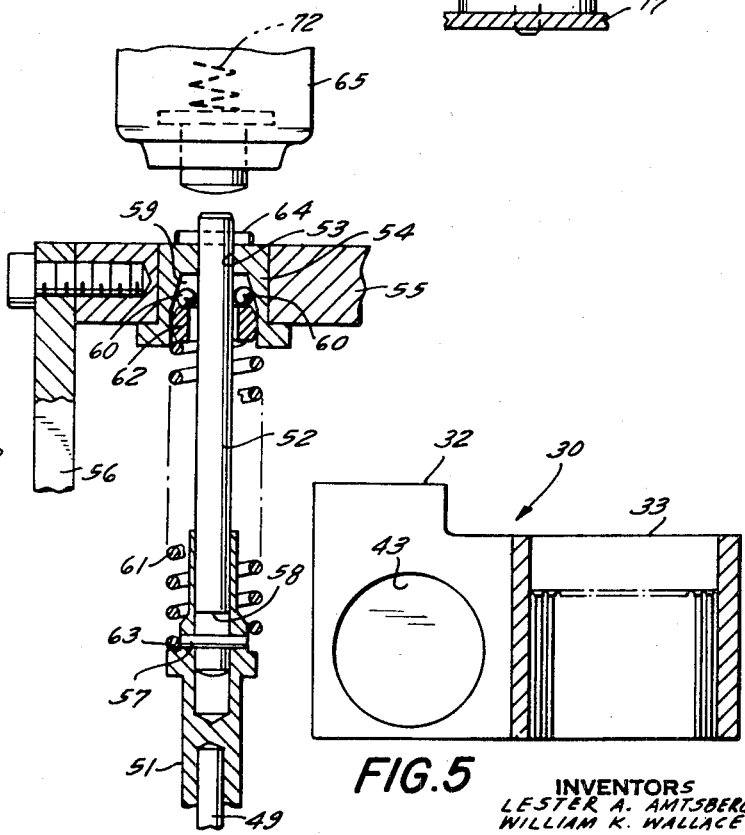

PNEUMATIC NUT-RUNNER HAVING A TORQUE SENSING DEVICE

BACKGROUND OF THE INVENTION

This is a division of application serial number 788,220 filed Dec. 31, 1968, now patent number 3,538,763 dated Nov. 10, 1970.

This invention relates to the art of torque sensing devices for pneumatic nut-running tools.

The general objective is to provide a pneumatic nut-running tool with a torque sensing device, which device is operable in response to reactionary torque transmitted to the tool's housing during operation of the tool so as to actuate a signal circuit when the required value of torque has been delivered to the work.

A feature of the device is that it utilizes reactionary torque transmitted to the housing of the tool for its operation. This enables the device to be located externally of the tool and enables it to be applied as a unit to the tool without modification of the usual internal mechanism of the tool.

The device may be used with an individual tool; or it may be used as a separate attachment with each of a plurality of similar tools mounted upon a common gang-plate. In the latter application, switch components of the several tools may be integrated in a common control or signal circuit.

BRIEF DESCRIPTION OF THE DRAWING

In the accompanying drawing:

FIG. 1 is an elevational view, partially in section, of a combined pneumatic nut-running tool and a torque sensing device embodying the invention;

FIG. 2 is a sectional view taken on line 2—2 of FIG. 1;

FIG. 3 is a fragmentary view of the left side of FIG. 1, with some portions broken away for convenience of illustration;

FIG. 4 is an enlarged detail of the switch rod and associated mechanism; and

FIG. 5 is a detail in section of the load arm.

DETAILED DESCRIPTION OF PREFERRED EMBODIMENT

In the drawing is disclosed a pneumatically powered nut-running tool 10 having a general housing 11 formed with a depending cylindrical tubular stem 12. The stem is journaled in bearings 13 and 14 mounted in a stationary open-ended supporting block 15 whereby the housing 11 is subject to angular turning relative to the block. The block is bolted fast, as indicated at 16, to the surface of a gang-plate 17. The gang-plate, together with the block 15, is normally held stationary during operation of the tool by means of an operator held handle (not shown).

Housed in a motor section 18 of the housing is a conventional rotary air-driven motor 19, the rotor of which is bearing mounted in the housing in usual manner for relative rotation. The rotor has a driving connection (not shown) with a stage of reduction gearing, generally indicated at 20, carrying the usual idler gears, a portion of one being shown at 21. The idler gears are meshed with a surrounding ring gear 22. The ring gear is fixed to the inner wall of a gear section 23 of the housing. The idler gears are carried by a spindle 24 to which they transmit the rotation of the motor. The spindle, in turn, has an internal splined driving connection 25 with an output or work shaft 26 adapted at its terminal end (not shown) to carry a wrench socket for engagement with a threaded fastener, such as a nut. Shaft 26 has a bearing support in a depending tube 28 that is fixed to the gang-plate 17.

Because of the mounted bearing arrangement of the housing 11 in the stationary supporting block 15, reactionary torque transmitted through the reduction gearing 20 and ring gear 22 to the housing will cause angular movement of the housing relative to the block.

A torque sensing device, generally designated 29, is operatively associated with the housing so as to utilize this angular movement of the housing to control operation of a signal circuit 31. The device includes a torque or load sensing member 30 having an arm 32 extending laterally from a cylindrical open-ended body portion 33. The latter is formed with internal splines with which the stem 12 of the housing has a splined driving connection 34. The body portion 33 of the sensing member is encircled by the supporting block 15 (FIG. 2), and its load arm 32 projects with some clearance, as at 35, through a longitudinal slot 36 formed in the sidewall of the supporting block 15. The clearance permits limited angular movement of the load arm 32 relative to the opposed walls of the slot. Fixed to an external flat surface 37 of the supporting block 15 adjacent the slot 36 is a push-rod guide block 38. The latter has an open-ended bore 39 (FIG. 3) extending transversely relative to the sidewall of the supporting block 15. A compression spring 41 is seated at one end in the bore against a cover plate 42 and is seated at its other end in an annular recess 43 of the load arm 32. It biases the load arm clockwise to a normal position in abutment with a rear edge 44 of slot 36, as best appears in FIG. 2.

A link or lever 45 (FIG. 3) of triangular form pivoted in a vertical slot 46 of an upper extension of the guide block 38 has a rounded corner 47 abutting an upper face area of the load arm 32. The link has an upper edge underlying the bottom end of a vertically slidable pushrod 49. Seated atop the rod, as best seen in FIG. 4, is a connector 51 having an axial bore in which the lower end of a switch rod 52 is slidably disposed. The upper end of the switch rod slidably projects through a guide hole 53 in a rod guide 54. The latter is fixed in a switch plate 55. The switch plate (FIGS. 1, 4) is supported in an elevated horizontal plane by means of a vertical rail 56. The latter is fixed at its upper end to the switch plate and is fixed at its lower end to a side of the guide block 38.

A loss-motion connection is provided between the connector 51 and the switch rod 52 by means of a pin 57 (FIG. 4) anchored in the connector and extending transversely through a slot 58 in the switch rod. The rod guide 54 has an enlarged coned recess 59 below its guide hole 53 in which a row of balls 60 are confined about the switch rod by means of an axially slidable washer 62 under the load of a compression spring 61. The spring is limited upon a shoulder 63 of the connector and it exerts through the washer and balls a friction drag upon the switch rod. The load of the spring also constantly biases the connector 51 downward so that its pin 57 normally abuts the bottom end of slot 58 and, as a consequence, presses the pushrod against the upper edge of link 45. This normally holds the link pivoted clockwise with its rounded corner 47 in contact with the inner face of the load arm, as appears in FIG. 3.

A transverse pin 64 fixed in the projecting upper end of the switch rod normally abuts the upper surface of the switch plate whereby the connector is normally held downwardly under the bias of the spring so as to abut pin 57 against the bottom end of slot 58.

A microswitch 65 is supported in close axially spaced relation to the top end of the switch rod 52. It is bolted fast to a side face of a switch block 66 having a floating support upon a spring 67. Spring 67 encircles a bolt 68 which is threadedly fixed to the switch plate 55 and extends vertically and slidably through the switch block. An adjustable nut 69 threaded upon a projecting end of the bolt may be selectively tightened or loosened, as needed, to adjust the spaced relation of the switch 65 to the switch rod. A guide pin 71, fixed in the switch plate 55 and extending slidably up into the switch block 66 in parallel relation to the bolt 68, restrains the switch block against relative rotation.

In summary of the operation of the torque sensing device 29, following engagement of the socket end of the tool with the work, the motor of the tool is pneumatically started. Torque delivered during the initial operation of the motor serves to freely run the work down to a preliminary degree of tightness and causes during this initial phase a corresponding torque reaction through the reduction gearing 20 and the ring gear 22 to the housing 11. This torque transmitted to the housing forces the load arm 32 slightly counterclockwise from its normal position against the resistance of spring 41. This initial movement of the load arm pivots the control link 45 (FIG. 3) counterclockwise (broken line) to force the pushrod 49 sufficiently upward to take up the loss-motion in the loss-motion pin connection 57, 58 and to then carry the switch rod 52 into abutment with the microswitch 65. The torque reaction being transmitted from the housing through the load arm to the pushrod during this initial rundown phase of the work is insufficient to move the switch rod sufficiently to actuate the switch to closed condition because of the opposing force of a switch spring 72. But as the torque delivered to the work increases, the resulting torque reaction transmitted to the housing 11 correspondingly increases to force the load arm 32 further clockwise to move the switch rod further upward. When the angular travel of the load arm 32 equals the preset value of travel required for the pushrod 49 and switch rod 52 to close the switch, the closed switch produces an electrical signal in the signal circuit 31. The signal circuit indicates in suitable manner that the preset or required value of torque to bring the work to a final degree of tightness has been delivered.

The nut-running tool 10 with which the torque sensing device 29 is associated is of a general type. It includes the usual torque responsive clutch (not shown) which cooperates with valve mechanism (not shown) upon delivery of the preset torque to interrupt flow of operating air to the motor. Mechanism of this general nature is disclosed in U.S. Pat. No. 3,298,481. This action occurs concurrently with the closing action of the microswitch 65. The sudden deceleration of the motor following shutoff of operating air decreases the applied torque so as to cause the load arm spring 41 to relax and force the load arm 32 angularly backwards to its normal position, accordingly, as the torque of the motor is reduced. As the load arm rotates backwardly, the switch rod spring 61 expands to restore the pushrod downward. The switch rod 52 does not immediately follow the return movement of the pushrod but remains elevated under the friction drag developed by the balls 60 to hold the switch closed. The switch rod is held briefly in this actuated condition until the loss-motion pin 57 is carried by the pushrod and connector to the bottom of the slot 58. Further return movement of the pushrod then causes the switch rod to be drawn by the connector away from the switch to allow the latter to reopen under the force of its return spring 72. The brief time delay obtained by means of the loss-motion connection during which the switch remains closed is designed to allow the usual relay (not shown) in the signal circuit 31 sufficient time to respond to the signal produced upon closing of the switch.

It is understood that the gang-plate is adapted to carry a plurality of the above described tools, and that a separate microswitch 65 individual to a separate torque sensing device 29 associated with each tool would be integrated in the signal circuit.

The sensing device 29, as illustrated, shows only one switch but another switch can be added so that a certain minimum value as well as a maximum value of torque applied to the faster can be indicated by the signal circuit.

What is claimed is:

1. A nut-running tool comprising a housing, a stationary block supporting the housing for relative rotation, motor-driven gearing in the housing having an output spindle and having a ring gear fixed to the housing so that torque of the gearing is transmitted to both the housing and the spindle in a particular direction, a torque arm fixed to the housing and extending laterally therefrom, a signal circuit control switch, a bracket supporting the switch to the block, and loss-motion linkage means arranged between the switch and the torque arm adapted upon an initial predetermined angular movement of the torque arm in said direction to take up the loss-motion in the linkage and adapted upon subsequent further predetermined angular movement of the torque arm to cause actuation of the switch, wherein the loss-motion linkage comprises: a pushrod slidable in the bracket, a lever pivoted in the bracket having one end abutting the torque arm and having an edge underlying a bottom end of the pushrod, a switch rod slidable in the bracket disposed in axial alignment with the switch and with the pushrod, the pushrod having a loss-motion connection with the switch rod arranged so that upon a predetermined initial angular movement of the torque arm the pushrod is caused to move relative to the switch rod until the loss-motion is taken up and upon subsequent further angular movement of the torque arm the pushrod and switch rod are caused to move as a unit relative to the switch.

2. A nut-running tool as in claim 1, wherein yieldable spring means disposed between the torque arm and the stationary block normally resists angular movement of the torque arm in said direction.

3. A nut-running tool as in claim 1, wherein the loss-motion connection is defined by means of a pin in the pushrod operable in a slot of the switch rod, and a spring load encircling the switch rod biasing the pushrod away from the switch rod into abutment with the lever.

4. A nut-running tool as in claim 1, wherein manipulative means is provided for selectively effecting adjustment of the spacing of the switch relative to the switch rod.

* * * * *